United States Patent [19]

Schlegel

[11] Patent Number: 4,641,987
[45] Date of Patent: Feb. 10, 1987

[54] CLIP FOR SUSPENDED CEILING GRIDWORK

[76] Inventor: Gary R. Schlegel, 1449 Plymouth Ave., Irwin, Pa. 15642

[21] Appl. No.: 749,771

[22] Filed: Jun. 28, 1985

[51] Int. Cl.⁴ ............................................. F16B 9/00
[52] U.S. Cl. .................................. 403/169; 403/170; 403/205; 403/231; 403/403; 52/280; 52/475
[58] Field of Search .............. 403/205, 403, 169, 170, 403/171, 172, 173, 176, 231; 52/475, 280, 288

[56] References Cited

U.S. PATENT DOCUMENTS

| | | | |
|---|---|---|---|
| 493,166 | 3/1893 | Johnson | 403/205 |
| 1,364,821 | 1/1921 | Trexler . | |
| 2,920,357 | 1/1960 | Ericson | 52/475 |
| 3,265,879 | 8/1966 | Ford et al. . | |
| 3,333,387 | 8/1967 | Deakins | 52/475 |
| 3,353,854 | 11/1967 | Hansen . | |
| 3,375,630 | 4/1968 | Dail | 52/475 |
| 3,425,726 | 2/1969 | Muller | 403/403 |
| 3,566,561 | 5/1971 | Tozer | 52/280 |
| 3,677,589 | 7/1972 | Roles | 52/475 |
| 4,078,847 | 3/1978 | Presnick | 403/171 |

Primary Examiner—Thomas F. Callaghan
Assistant Examiner—Todd G. Williams
Attorney, Agent, or Firm—H. Keith Hauger

[57] ABSTRACT

A gridwork for a suspended ceiling is assembled by a clip having three equally angularly disposed prongs which run parallel to three equally angularly disposed elongated rigid members of the gridwork. One prong has a stepped configuration, where each level abuts against a portion of two of the three intersecting members. One level of this stepped configuration widens into a lip fitting into a flanged or a "u" shaped channel area of one of the members, and which widened area further snaps into this one member for its securement therein. The remaining two prongs of the clip are bolted to its corresponding elongated member.

3 Claims, 3 Drawing Figures

CLIP FOR SUSPENDED CEILING GRIDWORK

BACKGROUND OF THE PRESENT INVENTION

The present invention relates to a suspended ceiling gridwork or framework assembly, and more particularly, to connecting together two or more elongated gridwork members.

Gridwork assemblies are used in forming bulkheads and/or drops in suspended ceilings. In these gridwork assemblies usually three elongated members are connected together such that each member is disposed 90° relative to each other in a three dimensional plane. Each member of the gridwork or framework assembly is interconnected at the site by a workman in accordance to one of the several known methods in the industry. A common known method for assembly is to partially overlap the structural members and fasten them together either by bolting or riveting.

Another way is to weld the elongated members together in a mutually perpendicular relation to form a tripod or three member corner. Other examples for connecting members together are disclosed in U.S. Pat. Nos. 3,265,879 and 3,353,854. The former patent utilizes a corner bracket in a drop for a suspended ceiling which bracket has a tab and flange portion for receiving an L-shaped structural member which is rotated to fit under the tab and to contact the flange portion of the bracket. The latter '854 patent discloses a corner assembly comprising structural members which slide over a corresponding arm portion of a tripod shaped member where a clamping plate is used to connect these three members together.

A drawback to some or all of the above known methods and/or designs for forming structural framework assemblies is that assemblage thereof requires a great deal of time and the use of several different tools. Other drawbacks to these known methods and designs are that in some instances, the finished product is weak; it can not be adjusted; and/or it is cumbersome and unsightly in view of its complicated design and/or the rivets or bolts or welded areas being exposed along the external surfaces of the structural members in these girdwork assemblies. Thus, there is a need in the industry for providing framework or gridwork assembly, particularly for use in a drop for a suspended ceiling which is easily formed and assembled on site by a workman with the use of only a few simple, manageable tools. Therefore, it is an object of the present invention to satisfy this need in the industry and to overcome the above disadvantages of the present methods and designs for assembling structural frameworks.

SUMMARY OF THE PRESENT INVENTION

A further object of the present invention is to provide a device for interconnecting the structural members to form a framework or gridwork assembly which device is relatively inexpensive to manufacture and purchase; easy to install; and aesthetically valuable.

Accordingly, the framework in the present invention includes three elongated members connected together by a clip assembly designed to extend in a mutually perpendicular relationship to the three elongated members in order to be fastened thereon to form a tripod or a three member corner. A clip assembly comprises three prongs, and each prong runs parallel to one of the elongated structural members where at least two of the prongs are bolted thereon, and the third prong is constructed such as to snap into its associates elongated member thereby to create a smooth external surface free from any protruding rivets or bolts.

More particularly, it is an object of the present invention to provide a structural assembly comprising at least two angularly disposed elongated rigid members, each having two opposed perpendicularly arranged legs, said legs of at least a first of said members each extending into a wall portion which terminates into a flanged portion along its longitudinal edge, which flanged portion forms an opening extending perpendicularly to its associated said wall portion, a clip member comprising at least two angularly disposed arm means corresponding to said at least two rigid members, one of said arm means having a first section constructed and arranged to be receivable in said opening of at least one of said legs of said first member and to abut against the associated wall portion of the other of said legs of said first member, said one arm means further having a second section coextending with said first section and being arranged in a stepped construction with the surface of said second section abutting against at least one said leg of a second of said two elongated members, and the other of said arm means of said clip member running adjacent to said second section of said one arm means and parallel to said second elongated rigid member, and means securing said other of said arm means of said clip member to said second elongated rigid member.

These and other objects, features, and advantages of the present invention will become more fully apparent from the following detailed description of the preferred embodiment, the appended claims, and the accompanying drawings of which:

DETAILED DESCRIPTION OF A PREFERRED EMBODIMENT

The present invention has particular application in forming a gridwork for a suspended ceiling which gridwork or drop may support one or a plurality of panel units. An example of a drop for a suspended ceiling suitable in understanding the full extent of the use of a preferred embodiment of the present invention is disclosed in the above mentioned U.S. Pat. No. 3,265,879 which is incorporated herein by reference.

Figure 2:
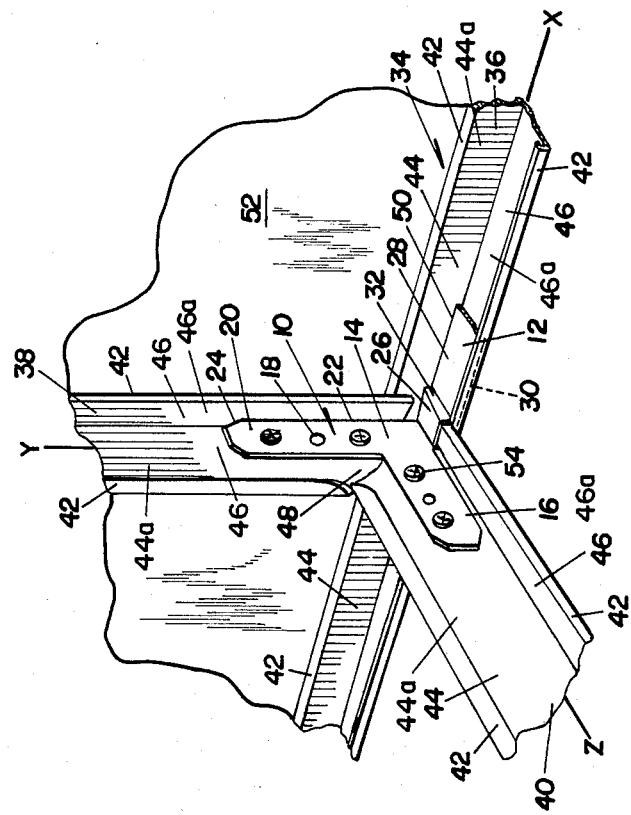
FIG. 2 is a perspective view illustrating the present invention for assemblage of a structural framework assembly.
Figure 1:
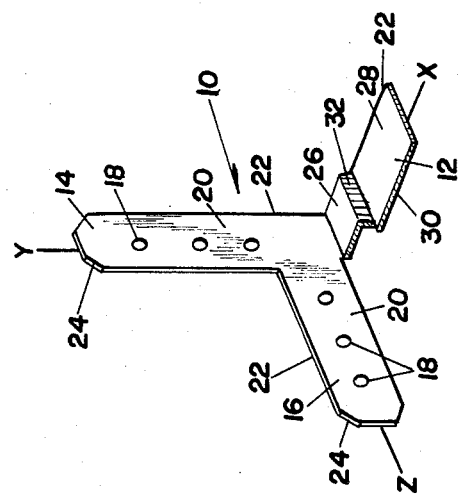
FIG. 1 is a perspective view illustrating the present invention.

Referring first to FIGS. 1 and 2, there is shown a clip assembly 10 comprising three elongated rigid arm portions or prong members 12, 14 and 16 which are integrally connected and which can be made from sheet metal through any of the well known processes, such as stamping; or which can be made from structural steel formed through a rolling process. These members 12, 14 and 16 are perpendicularly disposed relative to each other at approximately 90° and as shown extend in the x, y, and z directions respectively, as indicated in these FIGS. 1 and 2. Prong members 14 and 16 extending in the y and z directions respectively have similar configurations with openings 18 extending through from their front face 20 to their back face (not shown in FIGS. 1 and 2). Both front and back faces terminate to form outer edges 22 which are bevelled as shown at number 24 at their outermost ends (more about which will be discussed shortly).

Prong member 12 extending in the a direction has an elevated horizontal portion 26 and a lower horizontal portion 28 with a widened area forming a ledge or lip 30. Intermediate portion 32 interconnects the two horizontal portions 26 and 28 to create a stepped feature for prong member 12. Horizontal portions 26 and 28, as well as intermediate portion 32 have a relatively flat undersurface. Intermediate portion 32 is shown in FIG. 1 to be relatively flat, but it is noted that this area can be slightly curved to fit snugly against one of the members of structural assembly 34 (FIG. 2).

FIG. 2 particularly illustrates the assemblage of a structural framework or gridwork 34 by clip assembly 10. Clip assembly 10 is in a slightly different angle than that shown in FIG. 1 where a lower edge of prong 16 is slightly below horizontal portion 26; however, it is to be appreciated that with respect to a horizontal plane for clip assembly 10, horizontal portion 26 is substantially in the same plane as the lower edge of prong 16, with lower horizontal portion 28 being in a slightly lower horizontal plane. Framework 34 comprises elongated L-shaped members 36, 38, and 40, L-shaped members each have an upper leg 44 and a lower leg 46 perpendicular to upper leg 44 and are broken away for brevity. Member 36 is shown to particularly have a flanged or U-shaped channel 42 along each of its two diagonally disposed longitiduinal edges on upper leg 44 and lower leg 46. These L-shaped members are perpendicularly disposed relative to each other and extend in the x, y, and z directions parallel to their respective prong member 12, 14, 16. As shown in this FIG. 2, elongated L-shaped members 38 and 40 are bevelled at an angle such as to form a miter joint 48 in the y znd z planes and is fitted perpendicularly against upper leg 44 and lower leg 46 of L-shaped member 36. The longitudinal edges 42 of members 38 and 40 are bent over and may or may not be opened. It is apparent in FIG. 2 that upper leg 44 and lower leg 46 of elongated L-shaped member 36 extend in the y and z plane respectively; upper and lower legs 44, 46 of member 38 extend in the z and x plane, respectively; and upper and lower legs 44, 46 of member 40 extend in the y and x plane respectively. Each upper leg 44 and lower leg 46 of elongated members 36, 38, and 40 consist of a flat surface or wall portion indicated by 44a for upper leg 44 and 46a for lower leg 46 and a flanged portion along longitudinal edge 42, which edge 42 particularly of the lower leg 46 of elongated member 36 has a U-shape channel. Even though FIG. 2 may illustrate upper leg 44 of both elongated members 38 and 40 as being greater in width than lower leg 46 of each elongated member 38 and 40, it is to be appreciated that upper legs 44 and lower legs 46 may be equal in width, and clip assembly 10 will still operate according to its function.

A preferred operation for connecting these three L-shaped elongated members 36, 38 and 40 together by clip assembly 10 in the same manner as shown in FIG. 2 is simply by the workman first placing the back face of prong members 14 and 16 against the flat surface or wall portion 44a of upper leg 44 of each L-shaped members 38 and 40, respectively, i.e. prong member 14 against that of elongated member 38 and prong member 16 against that of elongated member 40. In doing this, upper horizontal portion 26 and intermediate portion 32 of prong member 12 abuts against a portion of lower leg 46 of member 40 in the z direction. For connection of elongated member 36 the lip 30 on lower horizontal portion 28 of prong 12 is fitted into U-shaped chanel 42 of this member 36 by slightly turning clip assembly 10 toward a 90° angle away from lower leg 46 of member 36 so that lip 30 of prong member 12 enters into channel 42 located on its lower leg 46. The undersurface of horizontal portion 28 abuts against a corresponding flat area surface of the lower leg 46 of member 36, and a longitudinal outer edge 22 of prong member 12 is wedged as shown at 50 against the wall of top leg 44 of member 36. In effect, prong 12 of clip assembly 10 is wedged into elongated member 36 to the extent that when a panel unit such as that disclosed in the aforemention '879 patent is installed, its weight can be taken up by members 36 and 40 without causing disengagement of clip assembly member 36 or vice versa.

Is is obvious that several alternative ways can be followed for the framework assembly 34 of FIG. 2 to support a panel unit one of which would be to attach member 36 and member 38 to the ceiling or side wall 52 and insert the panel such as to permit it to rest on both members 36 and 40. Several other procedures can be followed for supporting framework assembly 34 and/or its panels; however, it is to be noted that no matter which method is adopted the use of clip assembly 10 allows the external surfaces of members 36, 38 and 40 to be free of any rivets or bolts as particularly shown in FIG. 3.

FIG. 2 shows a single clip assembly 10; however, for a more sturdy construction, a second clip assembly 10 can be mounted on the back side of framework assembly 34 where the bolts 54 would be inserted in openings 18 of clip assembly 10 through members 38 and 40, and into corresponding openings in this second clip assembly. In this instance prong member 12 would be fitted into channel 42 and against flat surface area of upper leg 44 of member 36 in the x direction, another advantage of the present invention being that the design for clip assembly 10 can be standardized to accommodate any direction in which prong members 12, 14 and 16 may extend, thereby eliminating the need for a left and right hand clip assembly 10.

Figure 3:
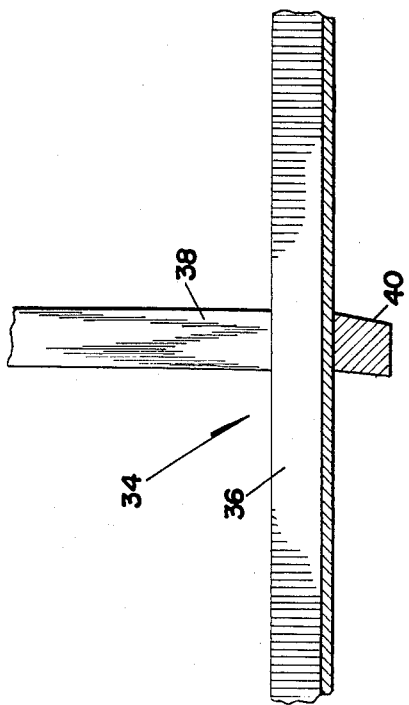
FIG. 3 is an elevational view showing a back side of the assemblage in FIG. 2 prior to its being mounted on a wall support.

FIG. 3 illustrates the back side of structural framework or gridwork assembly 34 in its assembled form through use of clip assembly 10 of the present invention, whereby as mentioned above, there exists a neat appearance with no bolts or rivets protruding through the smooth surfaces thereof.

The clip assembly 10 illustrated in FIGS. 1 and 2 has particular use for interconnecting three elongated structural members, however, it is to be understood that it can be used to connect less than three structural members and that it is not necessarily limited to the corners of a drop ceiling for the spanning of a structural member across a room.

While the present invention has been described in connection with the preferred embodiment thereof, it should be understood that there may be other embodiments which fall within the spirit and scope of the invention as defined by the following claims.

In accordance with the provisions of the patent statutes I have explained the principle and operation of my invention and have illustrated and described what I consider to represent the best embodiment thereof.

I claim:

1. A clip assembly for connecting at least a first and a second L-shape member together in an angular disposition where at least said first L-shape member has an opened channel, comprising:

at least a first and a second prong disposed in an angular disposition relative to each other, corresponding to said angular disposition of said L-shape members, said first prong having a stepped construction with a first and a second level where said first level has a widened surface area with a lip receivable in said opened channel of said first L-shape member whereby said widened surface area of said first prong is securable by a wedging action to said first L-shape member in a supporting relationship thereof, and said second level of said first prong has an indented surface area with a width less in dimension than said first level of said first prong with surfaces overlying said second L-shape member, said second prong integrally connected to said first prong and securable to said second L-shape member in a supporting relationship thereof.

2. A structural assembly, comprising:

at least a first and a second elongated rigid member disposed at right angles relative to each other, each said first and second elongated member having a first and a second leg perpendicularly arranged relative to each other and each leg having a wall portion, said first leg of said first elongated member having an opened channel coextending from said wall portion whose opening runs parallel to said wall portion of said first leg of said first elongated member, and a clip comprising at least a first and a second prong disposed at right angles relative to each other corresponding to said right angle disposition of said first and second elongated members, said first prong having a first portion with a lip receivable in said opening of said channel of said first leg of said first elongated member and a surface abutting against said wall portion of said second leg of said first elongated member such that said first prong is securely attached through a wedging action in said first elongated member in a supporting relationship thereof, said first prong further having a second portion coextensive to its said first portion having a lesser width dimension than said first portion and adapted to fit over said first leg of said second elongated member, said second prong being integrally connected to said first prong and extending parallel to said second elongated rigid member, and means for securing said second prong of said clip to said second leg of said elongated rigid member, whereby said securement of said second prong and said wedging action of said first prong interconnect said first and second elongated members as a unit in said right angle disposition.

3. A structural assembly according to claim 2, wherein said first and said second portion of said first prong are arranged in a stepped construction, and further comprising:

a third elongated rigid member arranged relative to said at least first and second elongated rigid members equally disposed in an angular fashion relative thereto, and wherein said clip member further comprises a third prong arranged relative to said at least a first and second prong angularly disposed to be equally disposed in an angular fashion relative thereto, and to extend outwardly parallel to said third elongated rigid member, and means for fastening said third prong of said clip member to said third elongated member.

* * * * *